United States Patent
Barker et al.

(10) Patent No.: US 7,724,420 B2
(45) Date of Patent: May 25, 2010

(54) FREQUENCY MODULATION STRUCTURE AND METHOD UTILIZING FROZEN SHOCKWAVE

(75) Inventors: Delmar L. Barker, Tucson, AZ (US);
William R. Owens, Tucson, AZ (US);
Abram G. Young, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/545,138

(22) Filed: Oct. 10, 2006

(65) Prior Publication Data

US 2008/0084604 A1 Apr. 10, 2008

(51) Int. Cl.
*G02F 1/35* (2006.01)

(52) U.S. Cl. .......................... 359/326; 385/7

(58) Field of Classification Search ................ None
See application file for complete search history.

(56) References Cited

U.S. PATENT DOCUMENTS

| | | | |
|---|---|---|---|
| 4,112,401 A | 9/1978 | Palmer et al. | |
| 5,937,118 A | 8/1999 | Komori | |
| 6,002,522 A | 12/1999 | Todori et al. | |
| 6,014,246 A | 1/2000 | Asher et al. | |
| 6,097,870 A | 8/2000 | Ranka et al. | |
| 6,134,369 A | 10/2000 | Kurosawa | |
| 6,430,342 B1* | 8/2002 | Kim et al. | 385/37 |
| 6,465,742 B1* | 10/2002 | Hiraoka et al. | 174/255 |
| 6,809,856 B2 | 10/2004 | Reed et al. | |
| 6,813,330 B1 | 11/2004 | Barker et al. | |
| 7,078,697 B2 | 7/2006 | Barker et al. | |
| 7,257,333 B2 | 8/2007 | Rosenwald et al. | |
| 7,292,740 B1 | 11/2007 | Barker et al. | |
| 2002/0021878 A1* | 2/2002 | Allan et al. | 385/129 |
| 2004/0062505 A1* | 4/2004 | Sugitatsu et al. | 385/131 |
| 2004/0070817 A1 | 4/2004 | Reed et al. | |
| 2005/0082480 A1 | 4/2005 | Wagner et al. | |

(Continued)

FOREIGN PATENT DOCUMENTS

EP 1336892 A1 * 8/2003

(Continued)

OTHER PUBLICATIONS

Smith, C. et al., "Low-loss hollow-core silica/air photonic band gap fibre," Nature, vol. 424, Aug. 7, 2003.

(Continued)

*Primary Examiner*—Uyen-Chau N Le
*Assistant Examiner*—Chad H Smith
(74) *Attorney, Agent, or Firm*—Renner, Otto, Boisselle & Sklar, LLP

(57) ABSTRACT

A system and method for modulating the frequency of electromagnetic radiation utilizes a frozen shockwave in a photonic band gap structure. The structure provides a discontinuity in lattice constant that functions as a shockwave, and that does not shift its position within the structure. In addition the modulation device or structure includes an acoustic pulse generator, such as a piezoelectric transducer coupled to one end of the photonic band gap structure. The acoustic pulse generator may be driven to produce a periodic pulse in the photonic band gap structure. The frozen shockwave, a defect or discontinuity in the photonic band gap structure, is used to hold incoming electromagnetic radiation in place. The acoustic pulse passing through the photonic band gap structure Doppler shifts the frequency of the radiation. The frequency-shifted radiation is then ejected out of the frozen shockwave portion of the photonic band gap structure.

45 Claims, 2 Drawing Sheets

U.S. PATENT DOCUMENTS

| | | | |
|---|---|---|---|
| 2006/0056463 A1* | 3/2006 | Wang et al. | 372/3 |
| 2006/0093296 A1* | 5/2006 | Jin et al. | 385/125 |
| 2006/0202125 A1 | 9/2006 | Suhami | |
| 2006/0257067 A1* | 11/2006 | Bratkovski et al. | 385/12 |
| 2007/0047965 A1* | 3/2007 | Liu et al. | 398/147 |
| 2007/0081165 A1* | 4/2007 | Kilic et al. | 356/477 |

OTHER PUBLICATIONS

Kehlif, A. et al., "Two dimensional phononic crystal with tunable narrow passband: Application to a waveguide with selective frequency," Jour. Appl. Phys., vol. 94, No. 3, Aug. 1, 2003.

Akahane, Y. et al., "High-Q photonic nanocavity in a two-dimensional photonic crystal," Nature, vol. 425, Oct. 30, 2003.

Johnson, S. et al., "Introduction to Photonic Crystals: Bloch's Theorem, Band Diagrams, and Gaps (But No Defects)," MIT, Feb. 3, 2003.

Reed, Evan J. et al., "The color of shock waves in photonic crystals", Photonic Crystals Materials and Devices II, Proc. of SPIE, (2004), vol. 5360, pp. 1-15.

International Search Report from corresponding international application No. PCT/US07/77841.

* cited by examiner

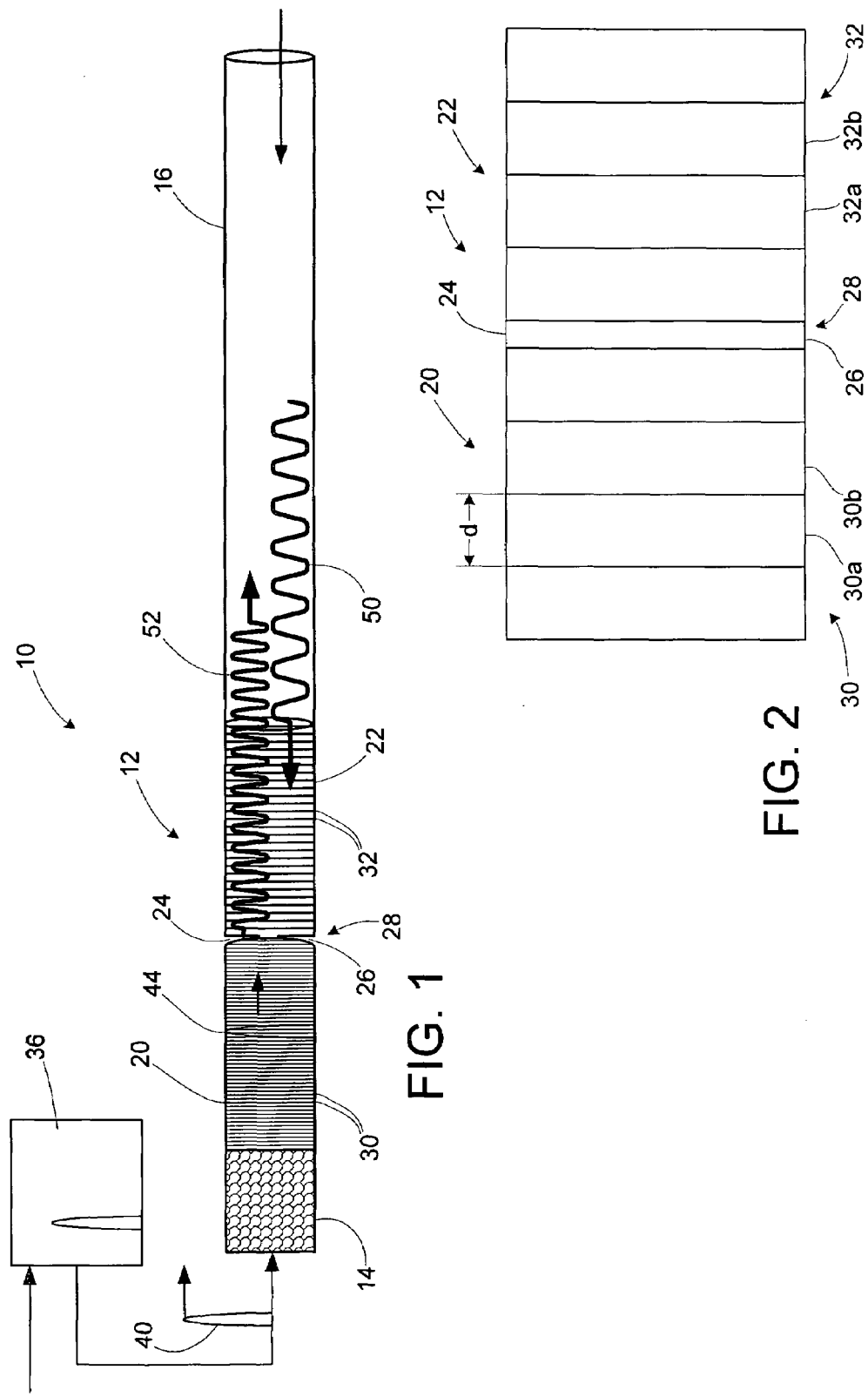

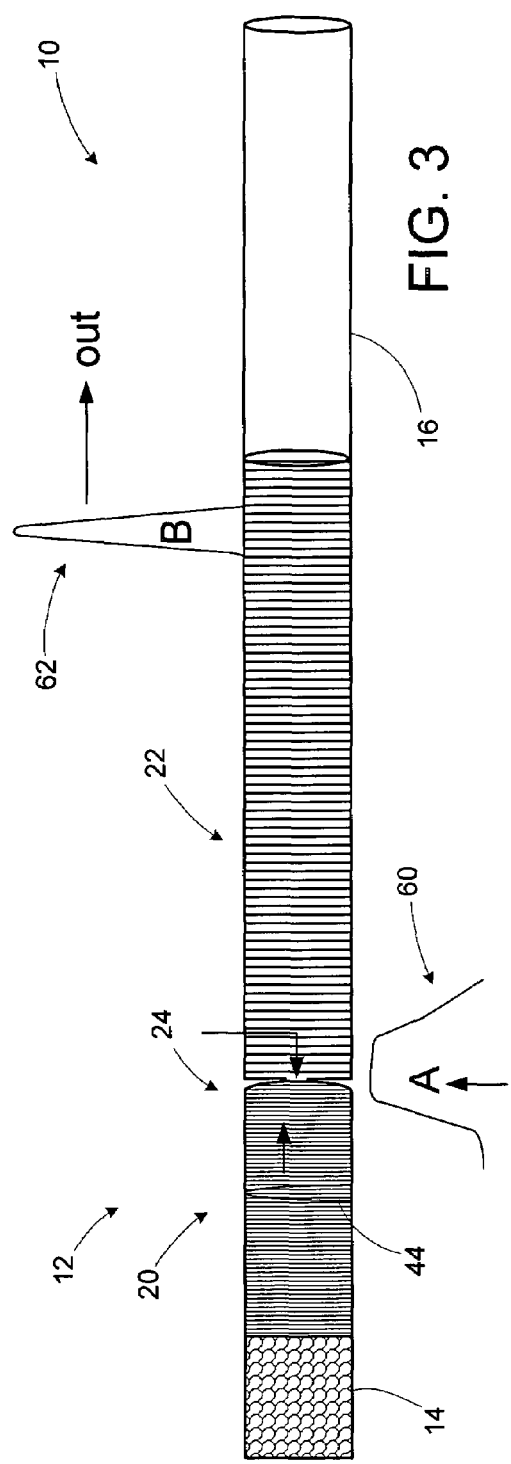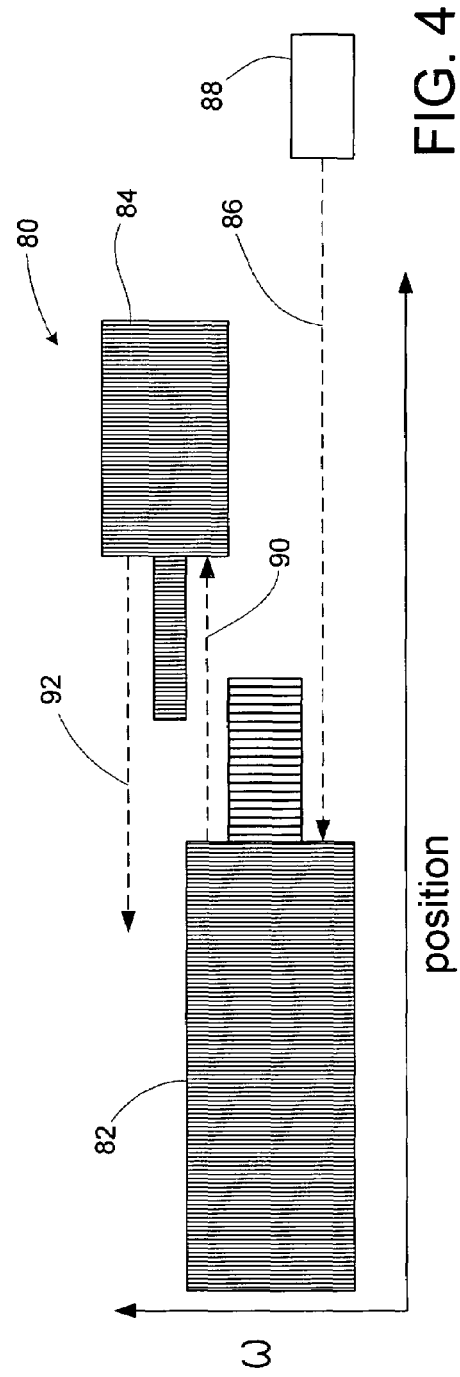

FREQUENCY MODULATION STRUCTURE AND METHOD UTILIZING FROZEN SHOCKWAVE

BACKGROUND OF THE INVENTION

1. Field of the Invention

The invention is in the field of photonic crystals and devices for modulating the frequency of electromagnetic rations.

2. Description of the Related Art

It is a difficult technical problem to create a device that will shift the frequency of electromagnetic radiation with a significant continuous dynamic range. One prior attempt to address the problem has been to use lasers with nonlinear crystals to generate higher harmonics. However, the generated frequencies are at discrete harmonic steps, rather than having a continuous range.

Another attempt to approach the problem has been to use Doppler shifting of frequencies. This produces a continuous shifting of frequencies up or down, but only allows for a limited range of frequency shift. In addition, Doppler shifting does not discriminate in its frequency shifting—all frequencies are shifted by the same amount.

A third way to shift electromagnetic frequency has been to use cavity tuning to shift frequency. However, cavity tuning may be expensive, and in any event produces only a limited amount of frequency shift.

U.S. Pat. No. 6,809,856, to Reed et al., describes a method of modulating frequency of electromagnetic radiation by inputting the radiation into a photonic crystal with a shockwave propagating therethrough. However, the method of propagating a shockwave through a photonic crystal usually destroys the crystal, rendering the method suitable for one-time use only. In addition, the propagating shockwave creates undesirable noise in the radiation output by the photonic crystal.

From the foregoing it may be seen that there is room for improvement in the field of frequency modulation.

SUMMARY OF THE INVENTION

According to an aspect of the invention, a method of modifying frequency of electromagnetic radiation includes the steps of: generating an acoustic pulse in a photonic band gap structure that has an internally constructed stationary shockwave; inputting the electromagnetic radiation into the photonic band gap structure; and modulating the electromagnetic radiation through action of the acoustic pulse while the electromagnetic radiation is retained at the stationary shockwave.

According to another aspect of the invention, an electromagnetic radiation frequency modulation device includes: a photonic band gap structure having a stationary shockwave therein; and an acoustic pulse generator coupled to the photonic band gap structure.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale:

FIG. 1 is a schematic diagram of frequency modulation device in accordance with an embodiment of the present invention;

FIG. 2 is a diagram of the photonic band gap structure of the device of FIG. 1;

FIG. 3 is a schematic diagram of a device for modulating thermal signature emissions; in accordance with another embodiment of the present invention; and FIG. 4 is a frequency diagram illustrating yet another embodiment of the present invention, an embodiment involving cascading photonic band gap structures in a frequency modulation device.

DETAILED DESCRIPTION

A system and method for modulating the frequency of electromagnetic radiation utilizes a frozen shockwave structure in a photonic band gap structure. The frozen shockwave structure provides a discontinuity in lattice constant that functions as a shockwave, and that does not shift its position within the structure. In addition the modulation device or structure includes an acoustic pulse generator, such as a piezoelectric transducer coupled to one end of the photonic band gap structure. The acoustic pulse generator may be driven to produce a periodic pulse in the photonic band gap structure. The frozen shockwave, a defect or discontinuity in the photonic band gap structure, is used to hold incoming electromagnetic radiation in place. The acoustic pulse passing through the photonic band gap structure Doppler shifts the frequency of the radiation, either increasing it or decreasing it. The frequency-shifted radiation is then ejected out of the frozen shockwave portion of the photonic band gap structure. In a one-dimensional configuration, the photonic band gap structure may be made of alternating layers of material having different indices of refraction. Two-dimensional and three-dimensional versions of the photonic band gap structure may also be produced.

Referring now to FIG. 1, a frequency modulation device or system 10 is shown. The frequency modulation device 10 includes a photonic band gap structure 12, coupled at opposite ends to an acoustic pulse generator 14 and to an input/output structure 16. The photonic band gap structure 12 may be a photonic band gap fiber that includes a pair of photonic band gap crystals 20 and 22 on opposite sides of a photonic band gap defect 24.

The photonic band gap defect 24 functions as a frozen shockwave 26 within the photonic band gap structure 12. A frozen shockwave, as the term is used herein, is defined as a fixed pattern in the material that acts as shockwave, and that has characteristics similar to that a moving shockwave would have if observed as a snapshot frozen time. A frozen shockwave is also referred to herein as a stationary shockwave. The frozen shockwave 26 is frozen in the sense that it does not move within the photonic band gap structure 12. The frozen shockwave 26 remains fixed in spatial location at an interface 28 between the photonic band gap crystals 20 and 22.

In the one-dimensional configuration shown in FIG. 1, the photonic band gap crystals 20 and 22 are each made of alternating layers of materials with different indices of refraction. The first photonic band gap crystal 20 is made of a series of layers 30 of material, while the second photonic band gap crystal 22 is made of layers 32 of material. The layers 30 and 32 are generally parallel to the interface 28 between photonic band gap crystals 20 and 22. The layers 30 may have the same thickness as the layers 32. As an alternative, the layers 30 may be thinner or thicker than the layers 32.

The layers 30 and 32 may be made of alternating types of dielectric materials having different indices of refraction. It will be appreciated that a wide variety of suitable dielectric materials may be employed. Silicon and silicon dioxide are examples of suitable materials for the layers 30 and 32. The thicknesses of the layers 30 and 32 may be set at any of a wide variety of values, depending upon the wavelength of the radiation involved. Suitable thicknesses would be on the order of the wavelength of the radiation, from fractions of a micron for visible light, to microns for infrared radiation, to on the order of a hundred microns for terahertz-frequency radiation.

FIG. 2 is a schematic diagram of the photonic band gap structure 12 in the region of the interface 28 between the photonic band gap crystals 22. The defect 24 may be a local variation in the pattern of the layers 30 and 32 of the photonic band gap crystals 20 and 22. The first photonic band gap crystal 20 includes the layers 30 with alternating layers of two types, layers 30a and 30b. The layers 30a are made of a first material having an index of refraction of $n_1$. The layers 30b are made of a second material having an index of refraction $n_2$. Similarly, the second photonic band gap crystal 22 has layers 32 of alternating materials, layers 32a and 32b. The layers 32a and 32b may be made of the same material as the layers 30a and 30b. The index of refraction between adjacent layers may be a ratio about 2 or greater, although it will be appreciated that a wide variety of different ratios of index of refraction are possible depending upon the desired photonic band gap.

The layers 30 and 32 may have a dimension d that is about equal to the wavelength of electromagnetic radiation that is being modulated. The photonic band gap defect 24 may be a layer having a different thickness, causing a variation in the pattern 30 and 32, and producing the frozen shockwave 26. Thus the lattice spacing may be varied in the photonic band gap defect 24. This produces a nearly stepwise discontinuity in the properties of the photonic band gap structure 12, although to some extent the material properties, such as the lattice gradient, about the frozen shockwave 26 may have some curve or slope that transitions between the discontinuity and the different values on either side of the frozen shockwave 26. The material for the layers 30 and 32 may be any of a wide variety of suitable materials, such as metals, glasses, plastics, or combinations of such materials.

There may be ten or more layers of material in the region of the frozen shockwave 26. The crystal regions on either side of the frozen shockwave would be expected to have many more layers of material, such as one hundred or more layers.

The photonic band gap defect 24 in effect becomes a dynamic squeezed cavity for upward or downward conversion of frequencies of incoming electromagnetic radiation. The lattice constant of the photonic band gap structure 12 varies across the interface 28. For a one-dimensional structure this lattice constant is determined by the thickness of the layers 30 and 32 of the photonic band gap crystals 20 and 22. It fixes the band gap on the two sides of the frozen shockwave 26, which determines the amount of frequency modulation that may occur.

The acoustic pulse generator 14 is in contact with the first photonic band gap crystal 20. The pulse generator 14 may include a suitable material for applying a periodic pulse to the first photonic band gap crystal 20. The acoustic pulse generator 14 may be a suitable piezoelectric material, for example lead zirconate titanate (PZT). A periodic electrical pulse or signal 40 may be sent to the acoustic pulse generator 14 by a suitable driver 36. The periodic signal 40 then causes periodic vibrations in the acoustic pulse generator 14, which in turn causes transmission and propagation of a periodic acoustic pulse 44 in the first photonic band gap crystal 20. The frequency of the periodic signal 40 may be any or a wide range of frequency, depending upon the desired output frequency rate. The periodic signal may have a frequency on the order of 1 Hz to 1 MHz, for example. It will be appreciated that other suitable frequency values may also be used.

The acoustic pulse 44 propagates through the photonic band gap structure 12 as a compression wave. When the acoustic pulse 44 reaches the frozen shockwave 26, the frozen shockwave 26 experiences translation and/or compression and decompression in a manner similar to what would occur due to a moving shockwave front. The acoustic pulse 44 acts to Doppler shift electromagnetic radiation that impinges on the frozen shockwave 26, upshifting or downshifting the frequency of the incoming electromagnetic radiation.

The pulse generator 14 may be any of a variety of devices or mechanisms for creating the acoustic pulse 44. For example, a laser pulse may be used to generate an acoustic pulse in a dielectric material, so a laser may function as the pulse generator 14. A variety of mechanical devices or mechanisms may be used to produce the acoustic pulse 44 in the photonic band gap structure 12. Examples include an impact by an object, an explosion, or an earthquake. Thus it will be appreciated that the device and method used herein may be used to detect impacts, explosions, and/or earthquakes, such as in a sensor. An output signal may be examined for modulation consistent with an acoustic pulse caused by an impact, an explosion, or an earthquake.

More broadly, the frequency modulation device 10 could be utilized as or in a vibration sensor, where the vibrations are from any of a variety of sources. The vibrations themselves could serve as the acoustic pulse 44 that causes frequency modulation to occur in the photonic band gap structure 12. The characteristics of the amount and type of modulation that occur could be dependent on the vibration that produces the acoustic pulse 44. Thus examination of a modulated output signal may allow information to be obtained regarding the detected vibration.

The input/output structure 16 may be any of a variety of suitable structures propagating an electromagnetic wave. An example of such structure is an optical fiber, made from a suitable plastic or silicon compound. The input/output structure 16 may be attached to the second photonic band gap crystal 22 by any of a variety of suitable methods.

General operation of the modulation device or system 10 is now described. An input signal 50 of electromagnetic radiation proceeds from the input/output structure 16 through the second photonic band gap crystal 22, and to the frozen shockwave 26 at the photonic band gap defect 24 (at the interface 28 between the photonic band gap crystals 20 and 22). The incoming electromagnetic radiation 50 is captured and retained in the frozen shockwave 26 for a controlled period of time by the photonic band gaps of the two regions. The frequency of the electromagnetic radiation will also be changed, such as from the bottom of a band gap of the structure 12 to the top of the band gap structure 12, or vice versa. The amount of frequency conversion in the photonic band gap structure 12 will be tunable by adjusting the band gap size, such as by varying the thickness and/or the composition of the layers 30 and 32. The Doppler shifting caused by the acoustic pulse 44 also affects the frequency shifting that occurs at the frozen shockwave 26. Varying the frequency of the acoustic pulse 44 affects the amount of frequency shifting. The bandwidth of the input signals 50 may also be increased or decreased within the frozen shockwave 26.

The acoustic pulse 44 causes the frequency of the electromagnetic radiation to increase until the radiation is no longer constrained by the band gap defect, at which time it is ejected as outgoing electromagnetic radiation 52. The combined action of the frozen shockwave 26 and the acoustic pulse 44 causes modulation of the incoming electromagnetic radiation 50, and ejection of it as the outgoing electromagnetic radiation 52. The outgoing radiation 52 may have its frequency shifted from that of the incoming electromagnetic radiation 50. The shift in frequency may be as much as about 15-20% of the incoming frequency, for example, depending upon the bandgap sizes.

The outgoing radiation 52 also may be modulated in ways other than a simple shift in frequency. This may serve to narrow or widen the frequency range of the outgoing radiation 52 relative to that of the incoming radiation 50. Thus narrow band radiation may be converted to wide band radiation, or vice versa.

Another possible use for the device 10 and method 20 described above is in modulating thermal signature emissions from objects. It will be appreciated that it may be desirable to alter the thermal signature of objects, the wavelengths of radiation naturally given off by an object of a given temperature and composition. Altering the thermal signature makes the object harder to detect, such as by infrared (IR) detection methods. If Planck radiation is used as input electromagnetic radiation to the device 10, the device 10 compresses and shifts the spectrum of the input radiation, which may be useful for thermal signature control.

FIG. 3 illustrates use of the device 10 for modulating thermal signature emissions. Planck energy 60, thermal energy generated from an object, is the input electromagnetic radiation. It is modulated by the device 10 into narrow band output electromagnetic radiation 62. Surface structures that emit thermal IR radiation may be covered with devices that employ the concept of the device 10, in order to modulate emitted radiation in real time. Material containing the frozen shockwaves may be part of the surface of the structural material.

In compressing the spectrum of electromagnetic radiation, higher frequency radiation may have its frequency relatively unchanged. Lower frequency radiation may have its frequency shifted upward more, as much as to the frequency of the higher frequency radiation.

Two or more frequency modulation devices 10 may be cascaded together (coupled in series) to obtain a greater amount of frequency shift. The devices 10 may be coupled together such that the electromagnetic radiation output from one device becomes the input electromagnetic radiation for a second device. This cascading may allow achievement of greater frequency shifts than is possible with use of a single device. In addition, cascading multiple devices together may allow for greater flexible in other types of frequency modulation, such as narrowing or widening the frequency bandwidth of electromagnetic radiation. Frequency shifting to terahertz (THz) levels may be accomplishable with such cascading.

Cascading of frozen shockwave devices is illustrated in FIG. 4, where a cascade system 80 includes a pair of photonic band gap crystal structures 82 and 84, which may be similar in structure to the photonic band gap structure 12 (FIG. 1) described above. An input electromagnetic radiation signal 86 from an electromagnetic radiation source 88, such as a laser, is modulated by the first photonic crystal 82 to produce an intermediate signal 90 of increased frequency. This intermediate signal 90 is then introduced into the second photonic crystal structure 84, which further increases the frequency to that of an output signal 92.

It will be appreciated that cascading such as that shown in the cascade system 80 may involve more than two stages, allowing for greater manipulation of the output signal (such as greater increases or decreases in frequency of the output signal). Timing of the various acoustic pulses may be controlled to coincide with the arrival of input signals at each additional level of a cascading system.

It will be appreciated that the structures and methods discussed herein create a wide variety of opportunities modulation of optical signals.

The device and method have been described above with regard to one-dimensional frequency modulation. It will be appreciated the device and method are applicable to two-dimensional and three-dimensional structures and methods, with suitable modifications. For example, a spherical structure with a central frozen shockwave could be constructed.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application. Further, with regard to the claims that follow, it is intended that the features recited in various claims be considered as combinable to the greatest extent practicable, even if they are not recited as features of the same claim or chain of claims, notwithstanding whether they are described herein with regard to the same embodiment.

What is claimed is:

1. A method of modifying frequency of electromagnetic radiation, the method comprising:

generating an acoustic pulse in a photonic band gap structure that has an internally constructed stationary shockwave;

inputting the electromagnetic radiation into the photonic band gap structure; and modulating the electromagnetic radiation through action of the acoustic pulse while the electromagnetic radiation is retained at the stationary shockwave;

wherein the modulating includes increasing frequency of substantially all of the electromagnetic radiation.

2. A method of modifying frequency of electromagnetic radiation, the method comprising:

generating an acoustic pulse in a photonic band gap structure that has an internally constructed stationary shockwave;

inputting the electromagnetic radiation into the photonic band gap structure; and modulating the electromagnetic radiation through action of the acoustic pulse while the electromagnetic radiation is retained at the stationary shockwave;
wherein the modulating includes decreasing frequency of substantially all of the electromagnetic radiation.

3. A method of modifying frequency of electromagnetic radiation, the method comprising:
generating an acoustic pulse in a photonic band gap structure that has an internally constructed stationary shockwave;
inputting the electromagnetic radiation into the photonic band gap structure; and
modulating the electromagnetic radiation through action of the acoustic pulse while the electromagnetic radiation is retained at the stationary shockwave;
wherein the modulating includes narrowing the frequency band of the electromagnetic radiation.

4. A method of modifying frequency of electromagnetic radiation, the method comprising:
generating an acoustic pulse in a photonic band gap structure that has an internally constructed stationary shockwave;
inputting the electromagnetic radiation into the photonic band gap structure; and
modulating the electromagnetic radiation through action of the acoustic pulse while the electromagnetic radiation is retained at the stationary shockwave;
wherein the modulating includes widening the frequency band of the electromagnetic radiation.

5. An electromagnetic radiation frequency modulation device comprising:
a photonic band gap structure having a stationary shockwave therein; and
an acoustic pulse generator coupled to the photonic band gap structure;
wherein the photonic band gap structure is a one-dimensional structure;
wherein the photonic band gap structure includes alternating layers of materials with different indices of refraction;
wherein the stationary shockwave is a discontinuity in the layers; and
wherein the stationary shockwave includes ten or more layers of alternating materials.

6. The device of claim 5, wherein the acoustic pulse generator includes a piezoelectric material connected to the photonic band gap structure.

7. An electromagnetic radiation frequency modulation device comprising:
a photonic band gap structure having a stationary shockwave therein; and
an acoustic pulse generator coupled to the photonic band gap structure;
further comprising an optical fiber connected to the photonic band gap structure;
wherein the acoustic pulse generator and the optical fiber are connected to opposite respective ends of the photonic band gap structure;
wherein the photonic band gap structure includes alternating layers of materials with different indices of refraction; and
wherein the stationary shockwave is a discontinuity in the layers.

8. The device of claim 7, wherein the photonic band gap structure is a multi-dimension structure.

9. The device of claim 8, wherein photonic band gap structure is a spherical structure.

10. The device of claim 5,
further comprising an additional photonic band gap structure that includes an additional stationary shockwave;
wherein the photonic gap structures are coupled in series to act sequentially to modulate frequency of input electromagnetic radiation.

11. A method of modifying frequency of electromagnetic radiation, the method comprising:
generating an acoustic pulse in a photonic band gap structure that has an internally constructed stationary shockwave;
inputting the electromagnetic radiation into the photonic band gap structure; and
modulating the electromagnetic radiation through action of the acoustic pulse while the electromagnetic radiation is retained at the stationary shockwave;
wherein the photonic band gap structure includes a pair of photonic band gap crystals on opposite sides of a photonic band gap defect that functions as the stationary shockwave; and
wherein a lattice constant determined by thickness of layers of the photonic band gap crystals of the photonic band gap structure varies across the photonic band gap defect, and determines the modulation of the electromagnetic radiation.

12. The method of claim 11, wherein the photonic band gap crystals are each made of alternating layers of materials with different indices of refraction.

13. The method of claim 12,
wherein the photonic band gap defect is a local variation in the pattern of the layers of the photonic band gap crystals; and
wherein the photonic band gap defect is at an interface between the photonic band gap crystals.

14. The method of claim 13, wherein the layers are substantially parallel to the interface.

15. The method of claim 13, wherein the photonic band gap defect includes a layer of material having a different thickness from the layers of the photonic band gap crystals.

16. The method of claim 12, wherein the layers of one of the of photonic band gap crystals each have a first thickness that is substantially the same as a second thickness of the layers of the other of the photonic band gap crystals.

17. The method of claim 12, wherein the layers of one of the of photonic band gap crystals each have a first thickness that is a different from a second thickness of the layers of the other of the photonic band gap crystals.

18. The method of claim 11, wherein the photonic band gap defect is at an interface between the photonic band gap crystals.

19. The method of claim 11, wherein the generating the acoustic pulse includes propagating the acoustic pulse through the stationary shockwave.

20. The method of claim 11, wherein the generating includes generating the acoustic pulse with a piezoelectric material that is coupled to the photonic band gap structure.

21. The method of claim 11, wherein the generating includes generating the acoustic pulse by vibration of an object mechanically coupled to the photonic band gap structure.

22. The method of claim 21, wherein the method of modifying frequency is at least part of a method of vibration sensing.

23. The method of claim 11,
wherein the electromagnetic radiation includes thermal radiation from an object operatively coupled to the photonic band gap structure; and wherein the modulating includes modulating the thermal radiation.

24. The method of claim 23, wherein the method of modifying frequency is at least part of a method of altering a thermal signature of the object.

25. The method of claim 11, wherein the modulating includes modulating the electromagnetic radiation by passing it into one or more additional photonic band gap structures, each having a stationary shockwave therein, wherein the photonic band gap structures are coupled in series.

26. An electromagnetic radiation frequency modulation device comprising:
a photonic band gap structure having a stationary shockwave therein; and
an acoustic pulse generator coupled to the photonic band gap structure;
wherein the photonic band gap structure includes a pair of photonic band gap crystals on opposite sides of a photonic band gap defect that functions as the stationary shockwave;
wherein the photonic band gap crystals are each made of alternating layers of materials with different indices of refraction;
wherein the photonic band gap defect is a local variation in the pattern of the layers of the photonic band gap crystals;
wherein the photonic band gap defect is at an interface between the photonic band gap crystals; and
wherein a lattice constant determined by thickness of layers of the photonic band gap crystals of the photonic band gap structure varies across the photonic band gap defect, and determines modulation of electromagnetic radiation incident on the photonic band gap structure.

27. The device of claim 26, wherein the layers are substantially parallel to the interface.

28. The device of claim 26, wherein the photonic band gap defect includes a layer of material having a different thickness from the layers of the photonic band gap crystals.

29. The device of claim 26, wherein the layers of one of the of photonic band gap crystals each have a first thickness that is substantially the same as a second thickness of the layers of the other of the photonic band gap crystals.

30. The device of claim 26, wherein the layers of one of the of photonic band gap crystals each have a first thickness that is a different from a second thickness of the layers of the other of the photonic band gap crystals.

31. The device of claim 26, wherein the acoustic pulse generator includes a piezoelectric material connected to the photonic band gap structure.

32. The device of claim 26,
further comprising an additional photonic band gap structure that includes an additional stationary shockwave;
wherein the photonic gap structures are coupled in series to act sequentially to modulate frequency of input electromagnetic radiation.

33. The method of claim 1, wherein the generating includes generating the acoustic pulse with a piezoelectric material that is coupled to the photonic band gap structure.

34. The method of claim 1, wherein the modulating includes modulating the electromagnetic radiation by passing it into one or more additional photonic band gap structures, each having a stationary shockwave therein, wherein the photonic band gap structures are coupled in series.

35. The method of claim 2, wherein the generating includes generating the acoustic pulse with a piezoelectric material that is coupled to the photonic band gap structure.

36. The method of claim 2, wherein the modulating includes modulating the electromagnetic radiation by passing it into one or more additional photonic band gap structures, each having a stationary shockwave therein, wherein the photonic band gap structures are coupled in series.

37. The method of claim 3, wherein the generating includes generating the acoustic pulse with a piezoelectric material that is coupled to the photonic band gap structure.

38. The method of claim 3, wherein the modulating includes modulating the electromagnetic radiation by passing it into one or more additional photonic band gap structures, each having a stationary shockwave therein, wherein the photonic band gap structures are coupled in series.

39. The method of claim 4, wherein the generating includes generating the acoustic pulse with a piezoelectric material that is coupled to the photonic band gap structure.

40. The method of claim 4, wherein the modulating includes modulating the electromagnetic radiation by passing it into one or more additional photonic band gap structures, each having a stationary shockwave therein, wherein the photonic band gap structures are coupled in series.

41. The method of claim 1, wherein the increasing frequency includes increasing frequency at least 15%.

42. The method of claim 2, wherein the decreasing frequency includes decreasing frequency at least 15%.

43. The method of claim 1, wherein a lattice constant determined by thickness of layers of the photonic band gap crystals of the photonic band gap structure varies across the internally constructed stationary shockwave, and determines modulation of electromagnetic radiation incident on the photonic band gap structure.

44. The method of claim 2, wherein a lattice constant determined by thickness of layers of the photonic band gap crystals of the photonic band gap structure varies across the internally constructed stationary shockwave, and determines modulation of electromagnetic radiation incident on the photonic band gap structure.

45. The device of claim 26, wherein the photonic band gap includes ten or more layers of alternating materials.

* * * * *